US010095211B2

(12) United States Patent
Wang et al.

(10) Patent No.: US 10,095,211 B2
(45) Date of Patent: Oct. 9, 2018

(54) RECTIFIER MIXED INSERTION SYSTEM WITH DIFFERENT POWER, AND ENERGY SAVING IMPLEMENTATION METHOD AND DEVICE THEREFOR

(71) Applicant: ZTE CORPORATION, Shenzhen, Guangdong Province (CN)

(72) Inventors: Wei Wang, Shenzhen (CN); Dongbo Liu, Shenzhen (CN); Bing Xue, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 307 days.

(21) Appl. No.: 14/904,950

(22) PCT Filed: Apr. 22, 2014

(86) PCT No.: PCT/CN2014/075918
§ 371 (c)(1),
(2) Date: Jan. 14, 2016

(87) PCT Pub. No.: WO2014/173284
PCT Pub. Date: Oct. 30, 2014

(65) Prior Publication Data
US 2016/0170396 A1 Jun. 16, 2016

(30) Foreign Application Priority Data

Jul. 29, 2013 (CN) .......................... 2013 1 0322367

(51) Int. Cl.
G05D 17/00 (2006.01)
G05B 19/042 (2006.01)
H02M 7/23 (2006.01)

(52) U.S. Cl.
CPC .......... *G05B 19/0428* (2013.01); *H02M 7/23* (2013.01); *G05B 2219/2639* (2013.01)

(58) Field of Classification Search
CPC ....... G05B 19/0428; G05B 2219/2639; H02M 7/23
(Continued)

(56) References Cited

U.S. PATENT DOCUMENTS 5,214,371 A * 5/1993 Naidu ................... H02J 7/1492
322/28
5,460,244 A 10/1995 Tanahashi
(Continued)

FOREIGN PATENT DOCUMENTS

CN 101442217 A 5/2009
CN 101488670 A 7/2009
(Continued)

*Primary Examiner* — Vu A Vu
(74) *Attorney, Agent, or Firm* — Ling Wu; Stephen Yang; Ling and Yang Intellectual Property

(57) ABSTRACT

A method for implementing energy saving for a mixed insertion system (80) of rectifiers with different power includes: acquiring work-related input information, and identifying a type of a rectifier (100); determining a power-on/power-off control mode of each rectifier (200); and performing power-on/power-off rotation, and load change rotation (400) and periodic rotation (500) starting according to the power-on/power-off control mode of each rectifier (300). A mixed insertion system of rectifiers with different power and a device for implementing energy saving thereof are further disclosed.

15 Claims, 7 Drawing Sheets

(58) Field of Classification Search
USPC .......................................................... 700/295
See application file for complete search history.

(56) References Cited

U.S. PATENT DOCUMENTS

| | | | |
|---|---|---|---|
| 6,018,200 A * | 1/2000 | Anderson | B23K 9/1062 |
| | | | 290/1 A |
| 6,788,032 B2 | 9/2004 | Chan et al. | |
| 6,788,036 B1 | 9/2004 | Milavec et al. | |
| 7,904,734 B1 | 3/2011 | Singla et al. | |
| 8,736,233 B2 * | 5/2014 | Muramatsu | H02M 7/17 |
| | | | 322/24 |
| 2008/0309300 A1 | 12/2008 | Liu et al. | |
| 2009/0307514 A1 | 12/2009 | Roberts et al. | |
| 2010/0019574 A1 * | 1/2010 | Baldassarre | H02J 3/14 |
| | | | 307/23 |
| 2011/0040993 A1 | 2/2011 | Chang | |
| 2013/0207562 A1 * | 8/2013 | Zhang | H02M 7/23 |
| | | | 315/201 |

FOREIGN PATENT DOCUMENTS

| | | |
|---|---|---|
| CN | 101552467 A | 10/2009 |
| CN | 101562349 A | 10/2009 |
| CN | 202206319 U | 4/2012 |
| CN | 102761423 A | 10/2012 |
| CN | 102857121 A | 1/2013 |
| CN | 102983755 A | 3/2013 |
| EP | 2393210 A1 | 12/2011 |
| JP | 2000116112 A | 4/2000 |
| WO | 2013060197 A1 | 5/2013 |

* cited by examiner

Device for implementing energy saving for a mixed insertion system of rectifiers with different power 70

First unit 71

Second unit 72

Third unit 73

Fourth unit 74

FIG. 7

Mixed insertion System of rectifiers with different power 80

Embedded chip 81

Bus unit 82

Relay 83

FIG. 8

RECTIFIER MIXED INSERTION SYSTEM WITH DIFFERENT POWER, AND ENERGY SAVING IMPLEMENTATION METHOD AND DEVICE THEREFOR

TECHNICAL FIELD

The present document belongs to the communication power supply technology, and particularly, to a technical scheme of mixedly inserting rectifiers with different power in parallel to supply power in the communication power supply.

BACKGROUND OF THE RELATED ART

Since the State-owned Assets Supervision and Administration Commission has convened the energy saving and emission reduction working conference for central enterprises, the energy saving and emission reduction has become an important indicator for measuring the future development of the central enterprises. Moreover, with the continuous promotion of the national energy saving and emission reduction policy, the three domestic major operators have more urgent requirements on the energy saving, and successively start the energy-saving transformation of the communication devices, and pay more attention to the energy-saving index of the products during the equipment purchasing, and with regard to the operators, the energy saving and emission reduction is more a cost revolution. At the present stage, the domestic telecom market is getting smooth and saturated, and in the condition of lacking "mace" services to stimulate the customer consumption, reducing the energy consumption and saving the cost has become an effective approach for the telecom enterprises promoting profits.

The number of the intra-network communication power supplies of the three major operators accumulatively exceeds a million, and the number of devices such as primary devices, power systems and machine room air conditioners of the communication network is also increasing. A plurality of devices have been operated for many years, and the energy consumption stays at a high level, which gradually cannot meet the operators' ever-increasing requirements on the energy saving and emission reduction. Therefore, reducing the energy consumption of the communication power supply can play a huge impelling role in the energy saving and emission reduction of the whole communication field. Not only the capital expenditure (CAPEX) can be optimized and the operation expenditure (OPEX) can be reduced for the operators, but also the enterprise social responsibility of the operators and all equipment manufacturers can be more reflected.

With the development of the communication power supply technology, the transfer efficiency of the rectifier module is greatly promoted, and an efficient rectifier module with the transfer efficiency above 96% appears. Due to the diversity of power supply application scenarios, there are also requirements of different power levels on the efficient rectifier module, for example, in an application scenario of baseband processing unit+radio remote unit (BBU+RRU) outdoor power supply or power supply in common machine room, only several ten to several hundred amperes of power supply current is required; and in an application scenario of the large power supply of the core network, it is required that the communication power supply can provide several thousand amperes of power supply current. The diversity of the power supply application scenarios promotes the serialization of the power levels of the rectifier, and the majority of manufacturers all can provide a series of rectifiers at different power levels, so as to adapt to such complicated requirement on the power supply current intensity.

However, in most of the application scenarios of the current network, a set of power supply system is always constituted by rectifiers at the same power level, to meet the power supply requirements of the load. Thus, a larger mismatch will occur between the power supply current actually required by the load and the rated output current provided by the power supply system in a plurality of scenarios, which causes the waste of capital investment of the operators purchasing the equipment, and also leads to a series of investment wasting behaviors such as the increase of operation maintenance cost and the increase of landed cost.

Based on the situation, the operators put forwards an application assumption of mixedly inserting rectifiers at different power levels in parallel to work in order to optimize the capital investment and the rate of return. However, since the application requirement still has more technical problems required to be overcome, it has not seen that products fully supporting the application requirement are marketed in the industry at present.

SUMMARY

The present document provides a method and device for implementing energy saving for a mixed insertion system of rectifiers with different power, which implements the maximization of the energy-saving effect in a premise of guaranteeing that the system is safe and reliable.

The present document discloses a method for implementing energy saving for a mixed insertion system of rectifiers with different power, which comprises:

acquiring work-related input information, and identifying a type of a rectifier;

determining a power-on/power-off control mode of each rectifier; and performing power-on/power-off rotation, and load change rotation and periodic rotation starting according to the power-on/power-off control mode of each rectifier.

Alternatively, in the above method, the work-related input information comprises but is not limited to the following information:

related parameter information, real-time data information and real-time alarm information.

Alternatively, in the above method, performing the power-on/power-off rotation according to the power-on/power-off control mode of each rectifier, comprises:

selecting models of rectifiers required to be powered on or powered off;

making statistics of phase currents of alternating current three phases, and powered-on times of rectifiers required to be powered on or powered off on the alternating current three phases;

performing powered-on time sequencing on the rectifiers of the alternating current three phases according to the phase currents of the alternating current three phases and the powered-on times of the rectifiers of the alternating current three phases; and performing power-on control or power-off rotation control according to the powered-on time sequencing, wherein, during the power-off control, performing a power-off operation on a rectifier with a longest powered-on time in the powered-on time sequencing, and during the power-on control, performing a power-on operation on a rectifier with a shortest powered-on time in the powered-on time sequencing in rectifiers in a power-off state.

Alternatively, in the above method, selecting the models of the rectifiers before the power-on/power-off operation comprises:

allocating working times of rectifiers at each power level according to a power ratio between rectifiers of different models, so that a power-on opportunity of the rectifier is directly proportional to power of the rectifier.

Alternatively, in the above method, performing powered-on time sequencing on the rectifiers of the alternating current three phases according to the phase currents of the alternating current three phases and the powered-on times of the rectifiers of the alternating current three phases comprises:

with respect to the power-on rotation, firstly performing sequencing from low to high according to a phase current of each phase, and when the phase currents are equal, performing sequencing from low to high according to the powered-on times of the rectifiers;

with respect to the power-off rotation, firstly performing sequencing from high to low according to the phase current of each phase, and when the phase currents are equal, performing sequencing from high to low according to the powered-on times of the rectifiers.

Alternatively, in the above method, the power-on rotation in the power-on/power-off rotation control comprises:

searching for rectifiers of a set model meeting a power-on condition from a first phase to a third phase orderly, and until a first rectifier of the set model meeting the power-on condition is found, powering on the found rectifier, and ending a current power-on rotation process.

Alternatively, in the above method, the power-off rotation in the power-on/power-off rotation control comprises:

searching for rectifiers of a set model meeting a power-off condition from the first phase to the third phase orderly, and until a first rectifier of the set model meeting the power-off condition is found, powering off the found rectifier, and ending the current power-off rotation process.

Alternatively, in the above method, the load change rotation comprises:

when a load suddenly becomes large, performing the power-on rotation control, and not performing any processing when making statistics of the phase currents in the power-on rotation control; and when the load suddenly becomes small, firstly calculating a load rate, and determining a rectifier of the largest model permitted to be powered off according to the load rate obtained by calculation and rated output currents of the rectifiers of each model, and performing a power-off rotation operation on the determined rectifier of the largest model permitted to be powered off, wherein, a numerator for calculating the load rate takes a maximum value from a total output current of the rectifiers and a load current, and a denominator for calculating the load rate is a sum of the rated output currents of the rectifiers which are powered on normally.

Alternatively, in the above method, the periodic rotation comprises:

whenever a rotation period is reached, determining a rectifier to be powered off according to a power-off principle; and powering on one or more rectifiers according to a power-on principle, and after output power of powered-on rectifiers is enough, directly powering off the determined rectifier to be powered off.

Alternatively, in the above method, manual maintenance testing comprises:

orderly powering on and powering off the rectifiers according to an address sequence, according to a predetermined power-on/power-off control mode of a rectifier, performing control on the rectifier, and when the control mode is power-on or no-control, compulsively powering on one rectifier; and when the control mode is power-off, calculating a load rate after the rectifier to be powered off is powered off, and when the load rate is less than a set rate, powering off the rectifier, and when the load rate is greater than or equal to the set rate, not powering off the rectifier.

The present document further discloses a device for energy saving for a mixed insertion system of rectifiers with different power, which comprises:

a first unit, configured to, acquire work-related input information, and identify a type of a rectifier;

a second unit, configured to, determine a power-on/power-off control mode of each rectifier; and a third unit, configured to, perform power-on/power-off rotation, and load change rotation and periodic rotation starting according to the power-on/power-off control mode of each rectifier.

The present document further discloses a mixed insertion system of rectifiers with different power, which comprises: an embedded chip, a bus unit and a relay, wherein:

the embedded chip is configured to, acquire work-related input information via the bus unit, and identify a type of a rectifier;

the bus unit is configured to, determine a power-on/power-off control mode of each rectifier; and the relay is configured to, perform power-on/power-off rotation, and load change rotation and periodic rotation starting according to the power-on/power-off control mode of each rectifier.

In the embodiment of the present document, with respect to the application scenario of mixedly inserting rectifiers with different power in parallel to supply power in the communication power supply, a new control method is put forward, which overcomes the key problem of energy-saving rotation control algorithm in the field. With the brand-new energy-saving control policy adopted in the embodiments of the present document, the maximization of the energy-saving effect is implemented in a premise of guaranteeing that the system is safe and reliable. In addition, in the embodiment, the management on the mixed insertion of rectifiers with different power can be implemented, and in the case of guaranteeing the load power supply and battery power supply, the rectifiers are kept at the high efficiency point as far as possible, and unnecessary modules are turned off as much as possible in the meantime to reduce the no-load loss, which implements the energy-saving management. When the rectifiers are controlled to power on and power off, firstly it is to guarantee that all rectifiers with different power have the opportunities to participate in the rotation and guarantee the three-phase equilibrium based on this, and secondly it is to guarantee that the working time of each module is balanced as far as possible, which extends the service life of the module, and improves the reliability of the system.

BRIEF DESCRIPTION OF DRAWINGS

FIG. 7 is a schematic diagram of a structure of a device for implementing energy saving for a mixed insertion system of rectifiers with different power according to the embodiment of the present document.

FIG. 8 is a schematic diagram of a structure of a mixed insertion system of rectifiers with different power according to the embodiment of the present document.

PREFERRED EMBODIMENTS OF THE INVENTION

The technical scheme of the present document will be described in detail in combination with the accompanying drawings below. It should be noted that the embodiments in the present document and the characteristics in the embodiments can be optionally combined with each other in the condition of no conflict.

Embodiment 1

With respect to the related technical problems, the following four aspects are considered.

1) The concept of a working time ratio of rectifiers can be adopted, and the working time of the rectifiers at each power level is allocated according to power ratios of the rectifiers, so that the high-power rectifiers can have more opportunities to be in a power-on state, and the power-on opportunities for the low-power rectifiers are relatively less. By doing this, the high-power rectifiers can be powered-on as much as possible, so as to make the number of the powered-on modules as small as possible, and reduce the no-load loss; and the rectifiers at each power level all can have opportunities to participate in the rotation, so that the working time of each module is balanced as far as possible, and the service life of the module is extended.

2) The load condition of the three phases can be calculated by means of rated current statistics on each phase, and the three-phase equilibrium of the system is preferentially controlled. The three-phase equilibrium is controlled according to the rated output condition of the rectifiers but not the number of the rectifiers on each phase, which can adapt to the situation that the rectifiers with different power are randomly inserted into arbitrary slots, and does not limit the slots in which the rectifiers are inserted.

3) In the load sudden change, the module can be automatically controlled to power on and power off according to the relative working time of the rectifiers with different power, the three-phase equilibrium principle and the working time balancing principle of a single module, which can make the rectifiers keep at the high efficiency point as far as possible in the case of guaranteeing the load power supply and battery power supply, and also guarantee that the working time of each module is balanced as far as possible, thereby extending the service life of the module.

4) During the periodic rotation, firstly a next module required to be powered off is found according to a power-off principle, and then one or more modules are powered-on according to a power-on principle, and after output power of the powered-on modules is enough, the previously found module required to be powered off is directly powered off, which can guarantee that the modules can rotate to work, and also guarantee the safe operation of the system.

Figure 1:
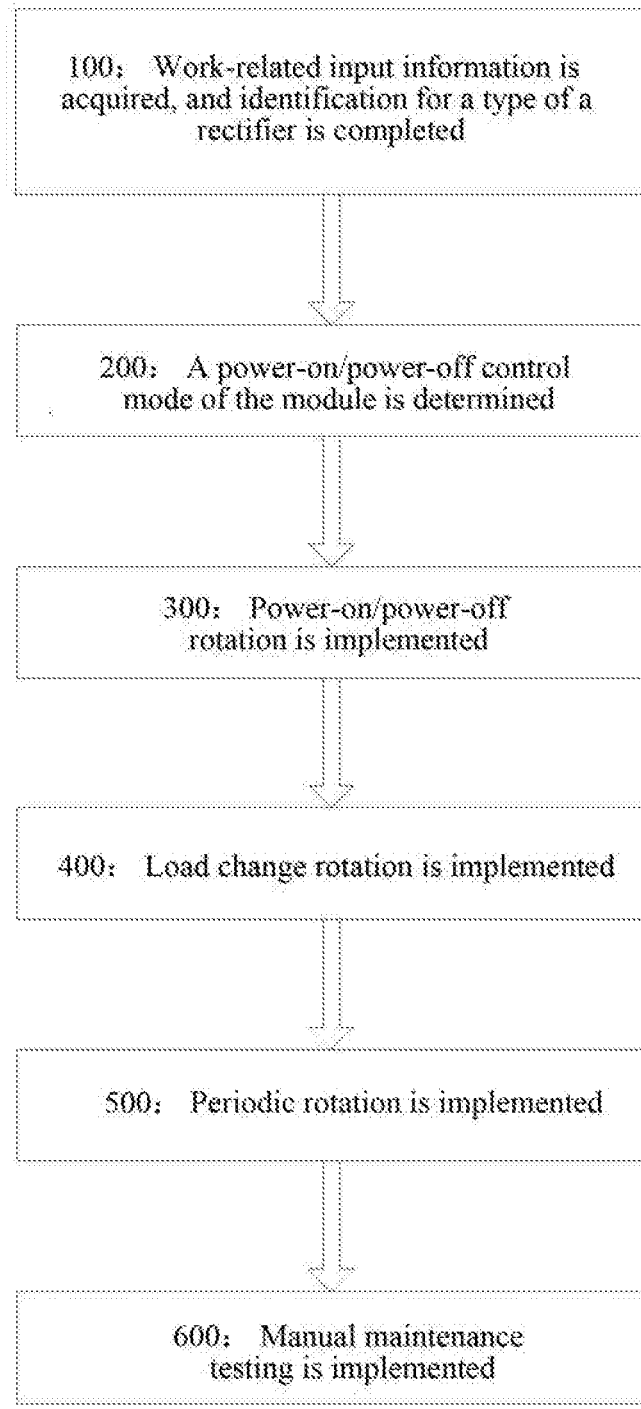
FIG. 1 is a schematic diagram of key implementation steps according to the embodiment of the present document.

Based on the above idea, the embodiment provides a method for implementing energy saving for a mixed insertion system of rectifiers with different power, and an implementation process thereof is as shown in FIG. 1, and the following steps 100 to 600 are included.

In step 100, work-related input information is acquired, and a type of a rectifier is identified.

The modularization design idea can be used in the operation of the step, and firstly it is to acquire the work-related input information, such as related parameter information, real-time data information and real-time alarm information and so on. Moreover, the method for acquiring the input information is not limited to the way of direct information acquisition, and comprehensive judgment also can be performed according to the acquired information, to obtain more detailed information.

In addition, it is also required to complete the identification for the types of the rectifiers with different power, and the identification can be completed by means of hardware characteristic signal, and the identification also can be completed by means of the software acquiring the communication data, for example, the software acquires manufacturer information of the rectifiers by means of communication, and then completes identification for the types of the rectifiers with different power according to the manufacturer information, and records information including the rated output current and so on of each rectifier.

In step 200, a power-on/power-off control mode of each rectifier is determined.

A current value required to be output by the system is calculated according to a real-time value of the load current and a real-time value of the battery current, and then in combination with a rated output current value of the powered-on rectifiers in the system, a current value required to be complementally output or decreasingly output by the system is obtained by calculation. If an unusual condition (such as a disconnection of the battery fuse, a detected abnormity of the battery current, and an alternating current power failure, etc.) occurs in the system, or the present output current of the system is not enough, or the number of the powered-on modules (i.e. the number of the powered-on rectifiers) does not reach the set minimum number of the powered-on modules, it can be determined that the power-on/power-off control mode of the rectifier is power-on. If no unusual condition occurs in the system, and the output current of the system is enough, and the number of the powered-on modules is reached the set minimum number of the powered-on modules, it can be determined that the power-on/power-off control mode of the module is power-off. If it is not the above case that the control mode is power-on or the control mode is power-off, it is regarded that the power-on/power-off control mode of the rectifier is no-control.

In step 300, power-on/power-off rotation is implemented according to the power-on/power-off control mode of each rectifier.

In the embodiment, the implementation of the power-on/power-off control process includes the following key flow.

Firstly, a model selection of the rectifier is performed before powering on and powering off.

In order to reduce the no-load loss, it is required to make the number of the powered-on rectifiers as small as possible, thus it is required to power on the high-power rectifiers as much as possible. Meanwhile, it is required to make the rectifiers of each model all have the opportunities to participate in the rotation. In the embodiment of the present document, during the implementation, the concept of a working time ratio of rectifiers is adopted, and the working time of the rectifiers at each power level is allocated according to power ratios of the rectifiers, so that the high-power rectifiers can have more opportunities to be in the power-on state, and the power-on opportunities for the low-power rectifiers are relatively less, that is to say, the working time of the rectifiers at each power level is allocated according to the power ratio between rectifiers of different models, so that the power-on opportunity of the rectifier is directly proportional to the power of the rectifier. By doing this, the high-power rectifiers can be powered-on as much as possible, so as to make the number of the powered-on rectifiers as small as possible, and reduce the no-load loss; and the rectifiers at each power level all can have the opportunities to participate in the rotation, so that the working time of each rectifier is balanced as far as possible, and the service life of the rectifier is extended.

In the embodiment of the present document, the system maintains timing of a power-on time for each rectifier, and a timing interval can be preset, for example, it is accumulated in minutes. The power-on time of the rectifier is timed when the rectifier is in the normal operation and in the power-on state, and it is reset when the communication of the rectifier is disconnected or the rectifier is not inserted, and it is kept when the rectifier is powered off or it is in other states such as a failure state and so on. The total working time of the rectifiers of each model is the accumulation of the power-on timing of all the existent rectifiers of the model.

The model selection of the rectifiers before powering on and powering off is to perform sequencing according to the average working time of the rectifiers of each model, when the rectifiers of a certain model do not exist or there is no rectifier of the module that can be powered-on or can be powered off, this type of rectifiers are compulsively sequenced to the last. Otherwise, the total working time of the rectifiers of each model is divided by the number of the normally working rectifiers of the model to obtain the average working time of the rectifiers of the model, and then the average working time of the rectifiers of the model is divided by a preset power ratio of the rectifiers of the model to obtain a final relative power-on time ratio. Eventually, sequencing is performed according to the relative power-on time ratio of the rectifiers of each model, and a rectifier model with the shortest power-on time is found, and it is determined as a next rectifier model required to be powered on. A rectifier model with the longest power-on time is found, and it is determined as a next rectifier model required to be powered off.

In the power-off rotation processing, it is also required to find the largest model permitted to be powered off according to the load rate.

Secondly, statistics of phase currents of alternating current three phases are made.

The phase current on each of the alternating current three phases is respectively acquired, and the phase current is a sum of the rated output currents of the powered-on rectifiers that normally work on a certain alternating current phase. In the power-on rotation processing, in the case of the normal rotation caused by the load change, no processing is performed on the phase current. In the case of periodic rotation, if a rectifier required to be powered off in the present rotation exists on a certain phase, it is required to subtract the rated output current of the rectifier required to be powered off in the present rotation from the phase current of the phase, to guarantee a equilibrium state for three phases is still maintained after the rotation.

In the power-off rotation processing, if rectifiers of a model that need to be most preferentially powered off exist on a certain phase, and rectifiers in a power-on state exit in these rectifiers, a relative value is added to the phase current of the phase, so that the rectifiers on the phase are easier to be preferentially powered off in the subsequent sequencing, which solves the problem that it is difficult to power off the rectifiers at a low power level due to the three-phase equilibrium principle. The principle of selecting the relative value added to the phase current is that: the relative value is not less than the maximum rated output current of the currently online rectifiers. When rectifiers meeting the condition do not exist on all the phases, the phase current is not adjusted, and it depends on the later powered-on time statistics to assist in completing the sequencing.

Then, the powered-on time statistics of the rectifiers of the alternating current three phases are made.

In the power-on rotation processing, it is required to acquire the shortest powered-on time of the rectifiers on the alternating current three phases. And in the power-off rotation processing, it is required to acquire the longest powered-on time of the rectifiers on the alternating current three phases.

Respectively acquiring the powered-on times of the rectifiers on the alternating current three phases includes the following steps.

1) In the power-on rotation processing, according to the supported rectifier models, it is to respectively make statistics of the shortest powered-on time of the designated model of rectifiers in the power-off state on each phase. In the power-off rotation processing, according to the supported rectifier models, it is to respectively make statistics of the longest powered-on time of the designated model of rectifiers in the power-on state on each phase.

2) Since the rectifiers of a designated model meeting the requirements do not always exist on each phase, the powered-on time statistics of the rectifiers of the alternating current three phases also needs to be adjusted according to the rectifier model. According to the priority of the determined rectifier model, the rectifiers of all models on each phase are traversed, and then the powered-on time of the rectifier on the designated phase is adjusted, and different time references are added, so that the relative powered-on time on the phase which has the rectifiers of the designated model most conforms to the requirements. That is, in the power-on rotation processing, the relative powered-on time on the phase which has the rectifiers of the designated model is the shortest; and in the power-off rotation processing, the relative powered-on time on the phase which has the rectifiers of the designated model is the longest.

3) The final relative powered-on times of the rectifiers on the alternating current three phases are output.

Then, the power-on/power-off priority sequencing of the rectifiers of the alternating current three phases is performed.

In the power-on rotation processing, firstly it is to perform sequencing from low to high according to the phase current of each phase. When the phase currents are equal, the rectifiers in the power-off state are sequenced from low to high according to the powered-on times of the rectifiers, wherein, the power-on operation is preferentially performed on a rectifier with the shortest powered-on time.

In the power-off rotation processing, firstly it is to perform sequencing from high to low according to the phase current of each phase. When the phase currents are equal, the rectifiers in the power-on state are sequenced from high to low according to the powered-on times of the rectifiers, wherein, the power-off operation is preferentially performed on a rectifier with the longest powered-on time.

Eventually, the power-on/power-off rotation control is performed.

Based on the previous sequencing, searching the rectifiers which need to be controlled to power on and power off is completed.

Firstly the processing process of the power-on rotation is introduced, and the process is mainly to search for rectifiers of a set model meeting a power-on condition orderly from the first phase to the third phase, and until a first rectifier of the set model meeting the power-on condition is found, power on the found rectifier, and end the current power-on rotation process, which is specifically divided into the following steps.

1) Firstly the first phase is selected, and rectifiers of the first model are searched for on the first phase.

2) If the rectifiers of the first model are found, the power-on processing is performed, and the flow ends.

3) If the rectifiers of the first model are not found, rectifiers of the second model are searched for on the first phase again, until the rectifiers of all models are searched.

4) If the rectifiers are still not found, it has to select the second phase, and then steps 1)~3) are repeated.

5) If the rectifiers are not found on all the three phases, it is regarded that there is really no rectifier that can be powered on, and the flow ends.

The processing process of the power-off rotation will be introduced below, the process is mainly to search for rectifiers of a set model meeting a power-off condition orderly from the first phase to the third phase, and until a first rectifier of the set model meeting the power-off condition is found, close the found rectifier, and end the current power-off rotation process, which is specifically divided into the following steps.

1) Firstly the first phase is selected, and rectifiers of the first model less than the largest model permitted to be powered off are searched for on the first phase.

2) If the rectifiers of the first model are found, the power-off processing is performed, and the flow ends.

3) If the rectifiers of the first model are not found, rectifiers of the second model less than the largest model permitted to be powered off are searched on the first phase again, until the rectifiers of all models less than the largest model permitted to be powered off are searched for.

4) If the rectifiers are still not found, it has to select the second phase, and then steps 1)~3) are repeated.

5) If the rectifiers are not found on all the three phases, it is regarded that there is really no rectifier that can be powered off, and the flow ends.

After finding the rectifiers which need to be controlled to power on and power off, the corresponding power-on/power-off control can be performed.

In step 400, the load change rotation is implemented. The load change includes the load suddenly becoming large and the load suddenly becoming small, which respectively corresponds to the above power-on rotation flow and power-off rotation flow.

When the load suddenly becomes large (that is, an increase rate of the load exceeds a first set value), and it is required to power on the rectifier, a rectifier which needs to be controlled to power on is found according to the foregoing power-on rotation flow, and then the rectifier is controlled to power on. It should be noted that, in the case of the power-on rotation caused by the load change, no processing is performed when making statistics of the phase currents.

When the load suddenly becomes small (that is, a decrease rate of the load exceeds a second set value), and it is required to power off the rectifier, due to the limitation of the load rate, the rectifiers of any model cannot be casually powered off, and the largest model permitted to be powered off needs to be obtained by calculation according to the load rate. When the load rate of the rectifier is calculated, since the battery may be charged or discharged, a numerator for calculating the load rate takes a maximum value from the total output current of the rectifiers and the load current, that is, the condition of the battery discharging is also considered, which ensures that the output capability of the rectifiers is enough after powering on/powering off. A denominator for calculating the load rate is a sum of the rated output currents of the rectifiers which are powered on normally. The current required for calculating a load rate of 80% is assumed, and in combination with the rated output currents of the rectifiers of each model, the largest model permitted to be powered off is determined.

A rectifier which needs to be controlled to power off is found according to the foregoing power-off rotation flow, and then the rectifier is controlled to power off, and the rotation process of the load becoming small can be completed.

In step 500, the periodic rotation on/off is implemented.

The periodic rotation requires compulsively powering on the rectifier and compulsively powering off the rectifier, so that the working time of each rectifier is balanced as far as possible, and the service life of the rectifier is extended. During the periodic rotation, according to the power-off principle, firstly a next rectifier required to be powered off is found, and then one or more rectifiers are powered-on according to the power-on principle, and after the output power of the powered-on rectifiers is enough, the previously found rectifier required to be powered off is directly powered off, which can guarantee that the rectifiers can rotate to work, and also guarantee the safe operation of the system. Therefore, the implementation of the periodic rotation is still based on the foregoing implementation of the power-on/power-off rotation.

When a rotation period is reached, a periodic rotation state is set, firstly a next rectifier required to be powered off is found, and then one rectifier is compulsively powered-on, and the periodic rotation flow is started. When it is to search for the rectifier required to be powered off, it is not limited by the load rate of the rectifier, that is, the rectifiers of any model can be powered off, that is, in the power-off rotation flow, the largest model permitted to be powered off is not limited.

After the periodic rotation state is set, when the power-on/power-off control mode of the module is determined in the step 200, it is required to subtract the rated output current value of the module to be powered off from the rated output current value of the powered-on rectifiers in the system, thus the system automatically becomes a state that it is required to complement the output current, and until the output capability of the system is enough, the power-on/power-off control mode of the rectifier will become power-off, which can solve the security problem in the rotation between the rectifiers with different power.

In the power-on rotation flow, in the case of the periodic rotation, if a rectifier required to be powered off in the present rotation exists on a certain phase, it is required to subtract the rated output current of the rectifier required to be powered off in the present rotation from the phase current of the phase, to guarantee an equilibrium state for the three phases is still maintained after the rotation.

About exiting from the periodic rotation, after the output power of the powered-on rectifiers is enough, the previously found rectifier required to be powered off can be directly powered off, and it successfully exits from the periodic rotation. When it is required to power on but there is no rectifier that can be powered on, it indicates that the system does not have the rectifier that can be powered on any more, and it also normally exits from the periodic rotation.

In step 600, the manual maintenance testing is implemented.

The manual maintenance testing is a working mode required in the energy-saving specifications of China Mobile, and it is mainly used for demonstrating the rectifier rotation to the users. In the case that a one-to-one corresponding relation is preset between slots and addresses of the rectifiers, it requires that the rectifiers can be powered-on and powered off for one period according to a slot sequence. During the manual maintenance testing, both the load rate and the three-phase equilibrium are secondary, it is mainly to guarantee that the load power supply is safe, and the rectifiers can be powered-on and powered off according to the slot sequence.

In implementation of the manual maintenance testing, before entering the rectifier rotation, all rectifiers are in the power-on state. When it is the first time to enter the rectifier rotation, the total current required to be output is acquired, and in combination with the set minimum number of powered-on rectifiers of the system, it is to orderly keep rectifiers at the low addresses enabled from the lowest address, and until the output requirements of the system are met, other rectifiers are controlled to power off. This is taken as an initial state of the manual maintenance testing on the rectifier rotation.

After entering the manual maintenance testing on the rectifier rotation, the rectifiers are orderly powered-on and powered off according to an address sequence. According to the power-on/power-off control mode of the rectifier determined in the step 200, the control is performed on the rectifier. When the control mode is power-on or no-control, one rectifier is compulsively powered-on; and when the control mode is power-off, a load rate after the rectifier to be powered off is powered off is calculated, and if the load rate is greater than or equal to a set rate (e.g. 80%), it is not permitted to power off the rectifier, and if the load rate is less than the set rate (e.g. 80%), the rectifier is powered off. It should be noted that, it is to judge whether the rectifier is permitted to power off according to a calculation result of the load rate, and if the rectifier is permitted to power off, it can only be powered off; and if the rectifier is not permitted to power off, it is required to continue to power on, until the condition of permitting to power off is met.

An exit condition of the manual maintenance testing on the rectifier rotation is that: 1) there is no rectifier that can be powered on; or 2) all rectifiers have completed the power-on/power-off rotation. The two is in a relation of or, that is, it can normally exit from the manual maintenance testing on the rectifier rotation when either 1) or 2) is met.

It is assumed that the power supply product of a certain company is used in a certain application scenario of mixedly inserting rectifiers with different power in parallel to supply power, the system capacity is 600 A, 4 first power modules of which the specification is 48V/50 A and 10 second power modules of which the specification is 48V/40 A are configured, and the load magnitude is 120 A.

The implementation of the energy-saving process of the mixed insertion system of rectifiers with different power in the above scenario will be described in detail below.

In step 1, the work-related input information is acquired, and the identification for a type of a rectifier is completed. Firstly it is required to acquire the work-related input information, including related parameter information, real-time data information and real-time alarm information and so on. The method for acquiring the input information not only includes the way of direct information acquisition, and it is also required to perform comprehensive judgment according to the acquired information, to obtain more detailed information.

In addition, it is also required to complete the identification for the types of the rectifiers with different power, here the identification is completed by means of the software acquiring manufacturer information of the rectifiers, and by comparing character strings of the manufacturer information of the rectifiers, the identification for the types of the rectifiers with different power is completed, and information including the rated output current and so on of each rectifier is recorded.

In step 2, a power-on/power-off control mode of the rectifier is determined. A current value required to be output by the system is calculated according to a real-time value of the load current and a real-time value of the battery current, and then in combination with a rated output current value of the powered-on rectifiers in the system, a current value required to be complementally output or decreasingly output by the system is obtained by calculation. If an unusual condition (such as a disconnection of the battery fuse, a detected abnormity of the battery current, and an alternating current power failure, etc.) occurs in the system, or the present output current of the system is not enough, or the number of the powered-on modules does not reach the set minimum number of the powered-on modules, it can be determined that the power-on/power-off control mode of the module is power-on. If no unusual condition occurs in the system, and the output current of the system is enough, and the number of the powered-on modules is reached the set minimum number of the powered-on modules, it can be determined that the power-on/power-off control mode of the module is power-off. If it is not the above case that the control mode is power-on or the control mode is power-off, it is regarded that the power-on/power-off control mode of the module is no-control.

In step 3, the power-on rotation implementation is performed.

Figure 2:
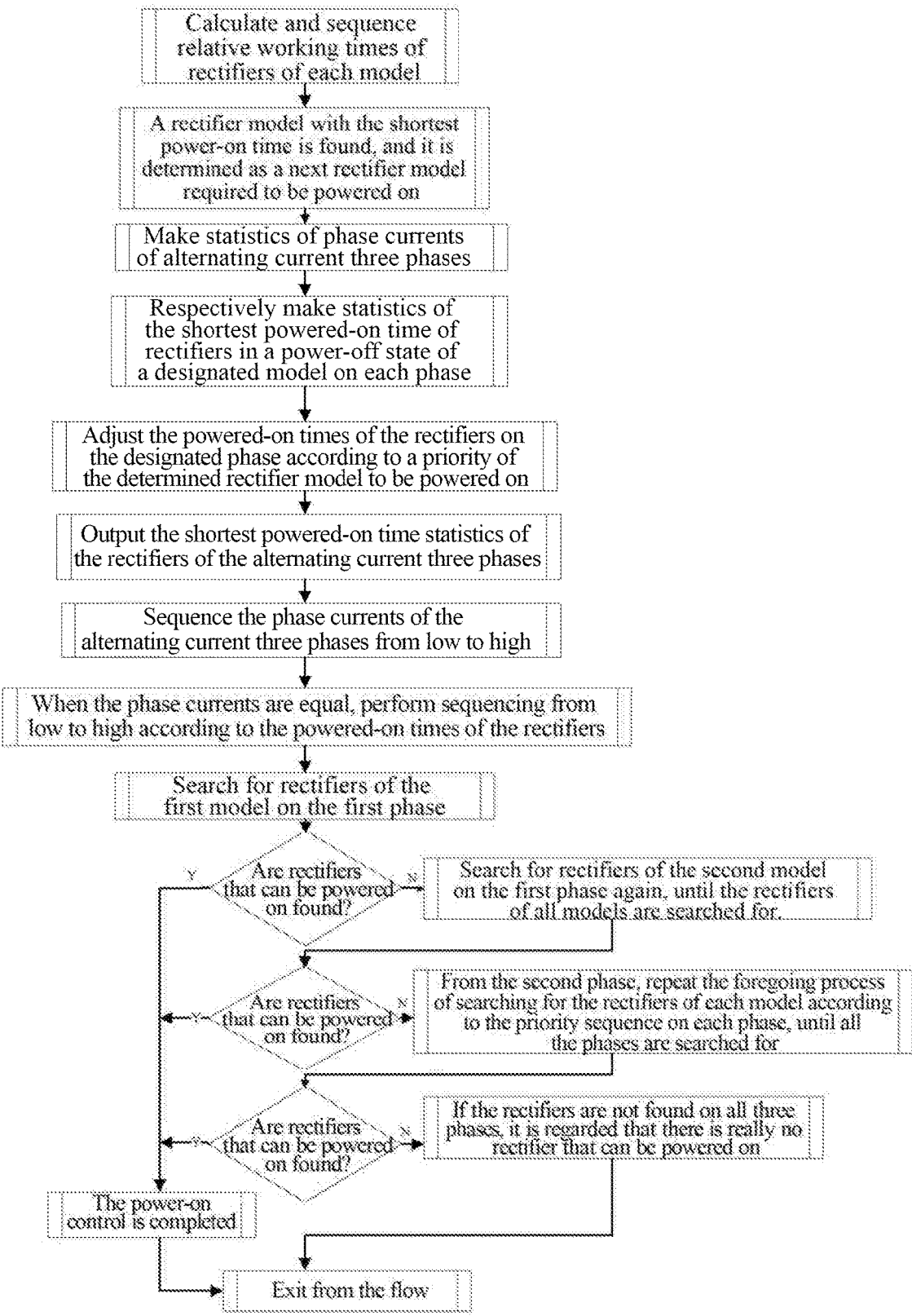
FIG. 2 is a flow chart of implementing power-on rotation.

Correspondingly, the power-on rotation process is as shown in FIG. 2, and the key flow of this part of implementation includes the following steps.

(1) The Model Selection of the Rectifiers Before Powering On.

Firstly it is to perform sequencing according to the average working time of the rectifiers of each model, when the rectifiers of a certain model do not exist or there is no rectifier of the model that can be powered-on, this type of rectifiers are compulsively sequenced to the last. Otherwise, the total working time of the rectifiers of each model is divided by the number of the normally working rectifiers of the model to obtain the average working time of the rectifiers of the model, and then the average working time of the rectifiers of the model is divided by a preset power ratio of the rectifiers of the model to obtain a final relative power-on time ratio. Eventually, sequencing is performed according to the relative power-on time ratio of the rectifiers of each model, and a rectifier model with the shortest power-on time is found, and it is determined as a next rectifier model required to be powered on.

(2) Statistics of Phase Currents of Alternating Current Three Phases.

The phase current on each of the alternating current three phases is respectively acquired, and the phase current is a sum of the rated output currents of the powered-on rectifiers that normally work on a certain alternating current phase. In the power-on rotation processing, in the case of the normal rotation caused by the load change, no processing is performed on the phase current. In the case of periodic rotation, if a rectifier required to be powered off in the present rotation exists on a certain phase, it is required to subtract the rated output current of the rectifier required to be powered off in the present rotation from the phase current of the phase, to guarantee a equilibrium state for the three phases is still maintained after the rotation.

(3) The Powered-On Time Statistics of the Rectifiers of the Alternating Current Three Phases.

The flow is required to acquire the shortest powered-on time of the rectifiers on the alternating current three phases. Firstly, according to the supported rectifier models, it is to respectively make statistics of the shortest powered-on time of the designated model of rectifiers in the power-off state on each phase. Then, according to the priority of the determined rectifier model, the rectifiers of all models on each phase are traversed, and the powered-on times of the rectifiers on the designated phase are adjusted, and different time references are added, so that the relative powered-on time on the phase which has the rectifiers of the designated model is the shortest. The final relative powered-on times of the rectifiers on the alternating current three phases are eventually output.

(4) Power-On/Power-Off Priority Sequencing of the Rectifiers of the Alternating Current Three Phases.

Firstly it is to perform sequencing from low to high according to the phase current of each phase. When the phase currents are equal, it is to perform sequencing from low to high according to the powered-on times of the rectifiers.

(5) Power-On/Power-Off Rotation Control.

Based on the previous sequencing, searching for the rectifiers which need to be controlled to power on is completed, which is divided into the following steps.

1) Firstly the first phase is selected, and rectifiers of the first model are searched for on the first phase.

2) If the rectifiers of the first model are found, the power-on processing is performed, and the flow ends.

3) If the rectifiers of the first model are not found, rectifiers of the second model are searched for on the first phase again, until the rectifiers of all models are searched.

4) If the rectifiers are still not found, it has to select the second phase, and then steps 1)~3) are repeated.

5) If the rectifiers are not found on all the three phases, it is regarded that there is really no rectifier that can be powered on, and the flow ends.

In step 4, the power-off rotation implementation is performed.

Figure 3:
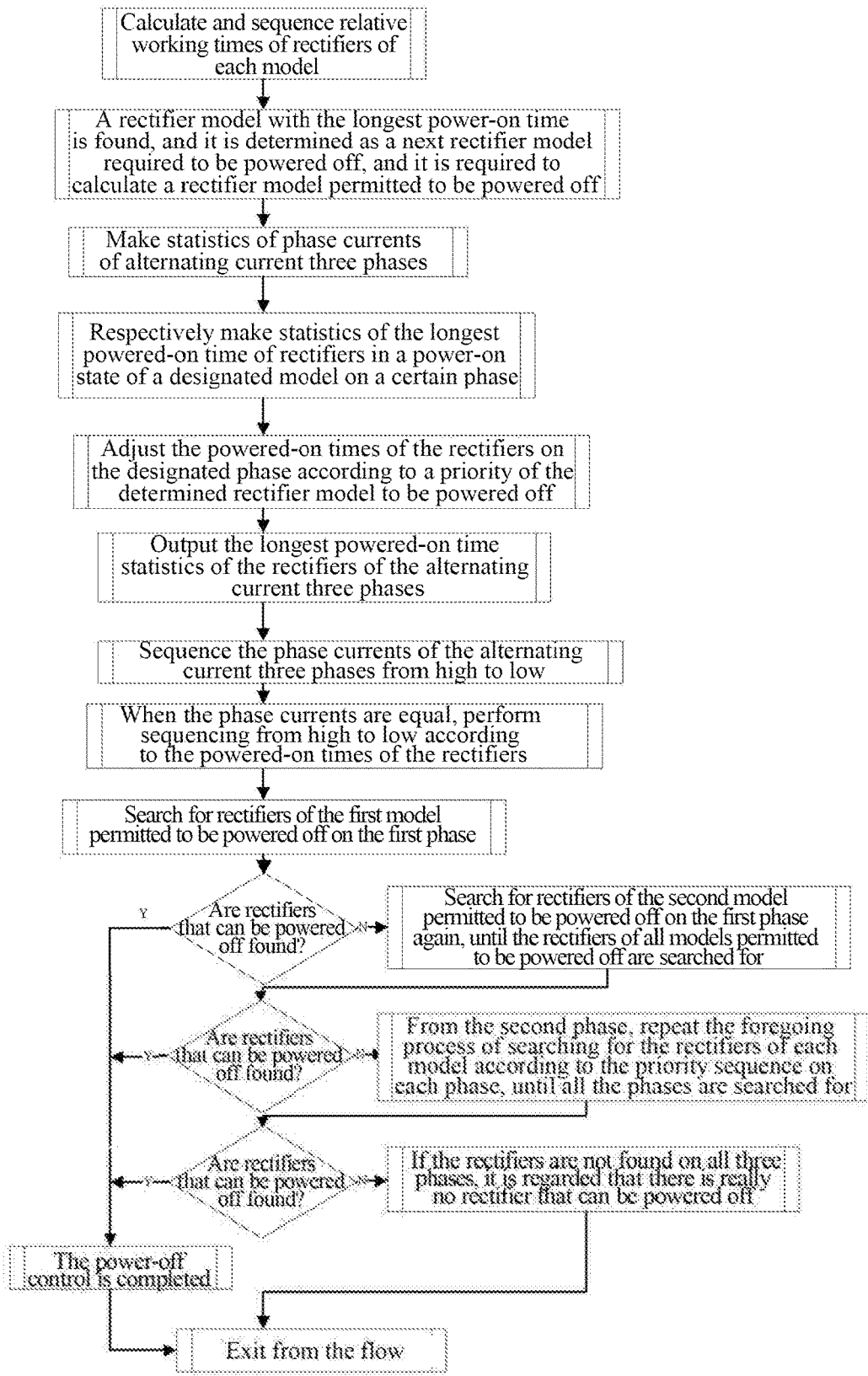
FIG. 3 is a flow chart of implementing power-off rotation.

Correspondingly, the power-off rotation process is as shown in FIG. 3, and the key flow of this part of implementation includes the following steps.

(1) The Model Selection of the Rectifiers Before Powering Off.

Firstly it is to perform sequencing according to the average working time of the rectifiers of each model, when the rectifiers of a certain model do not exist or there is no rectifier of the model that can be powered off, this type of rectifiers are compulsively sequenced to the last. Otherwise, the total working time of the rectifiers of each model is divided by the number of the normally working rectifiers of the model to obtain the average working time of the rectifiers of the model, and then the average working time of the rectifiers of the model is divided by a preset power ratio of the rectifiers of the model to obtain a final relative power-on time ratio. Eventually, sequencing is performed according to the relative power-on time ratio of the rectifiers of each model, and a rectifier model with the longest power-on time is found, and it is determined as a next rectifier model required to be powered off.

Moreover, in the power-off rotation processing, it is also required to find the largest model permitted to be powered off according to a load rate.

(2) Statistics of Phase Currents of Alternating Current Three Phases.

The phase current on each of the alternating current three phases is respectively acquired, and the phase current is a sum of the rated output currents of the powered-on rectifiers that normally work on each alternating current phase. In the power-off rotation processing, if rectifiers of a model that needs to be most preferentially powered off exists on a certain phase, and rectifiers in a power-on state exits in these rectifiers, a relative value is added to the phase current of the phase, so that the rectifiers on the phase are easier to be preferentially powered off in the subsequent sequencing, which solves the problem that it is difficult to power off the rectifiers at a low power level due to the three-phase equilibrium principle. The principle of selecting the relative value added to the phase current is that: the relative value is not less than the maximum rated output current of the currently online rectifiers. When rectifiers meeting the condition do not exist on all the phases, the phase current is not adjusted, and it depends on the later powered-on time statistics to assist in completing the sequencing.

(3) The Powered-On Time Statistics of the Rectifiers of the Alternating Current Three Phases.

The flow is required to acquire the longest powered-on time of the rectifiers on the alternating current three phases. Firstly, according to the supported rectifier models, it is to respectively make statistics of the longest powered-on time of the designated model of rectifiers in the power-on state on each phase. Then, according to the priority of the determined rectifier model, the rectifiers of all models on each phase are traversed, and the powered-on times of the rectifiers on the designated phase are adjusted, and different time references are added, so that the relative powered-on time on the phase which has the rectifiers of the designated model is the longest. The final relative powered-on times of the rectifiers on the alternating current three phases are eventually output.

(4) Power-On/Power-Off Priority Sequencing of the Rectifiers of the Alternating Current Three Phases.

Firstly it is to perform sequencing from high to low according to the phase current of each phase. When the phase currents are equal, it is to perform sequencing from high to low according to the powered-on times of the rectifiers.

(5) Power-On/Power-Off Rotation Control.

Based on the previous sequencing, searching for the rectifiers which need to be controlled to power off is completed, which is divided into the following steps.

1) Firstly the first phase is selected, and rectifiers of the first model less than the largest model permitted to be powered off are searched for on the first phase.

2) If the rectifiers of the first model are found, the power-off processing is performed, and the flow ends.

3) If the rectifiers of the first model are not found, rectifiers of the second model less than the largest model permitted to be powered off are searched for on the first phase again, until the rectifiers of all models less than the largest model permitted to be powered off are searched for.

4) If the rectifiers are still not found, it has to select the second phase, and then steps 1)~3) are repeated.

5) If the rectifiers are not found on all the three phases, it is regarded that there is really no rectifier that can be powered off, and the flow ends.

In step 5, the load change rotation implementation is performed.

The load change includes the load suddenly becoming large and the load suddenly becoming small, which respectively corresponds to the above power-on rotation flow and power-off rotation flow.

Figure 4:
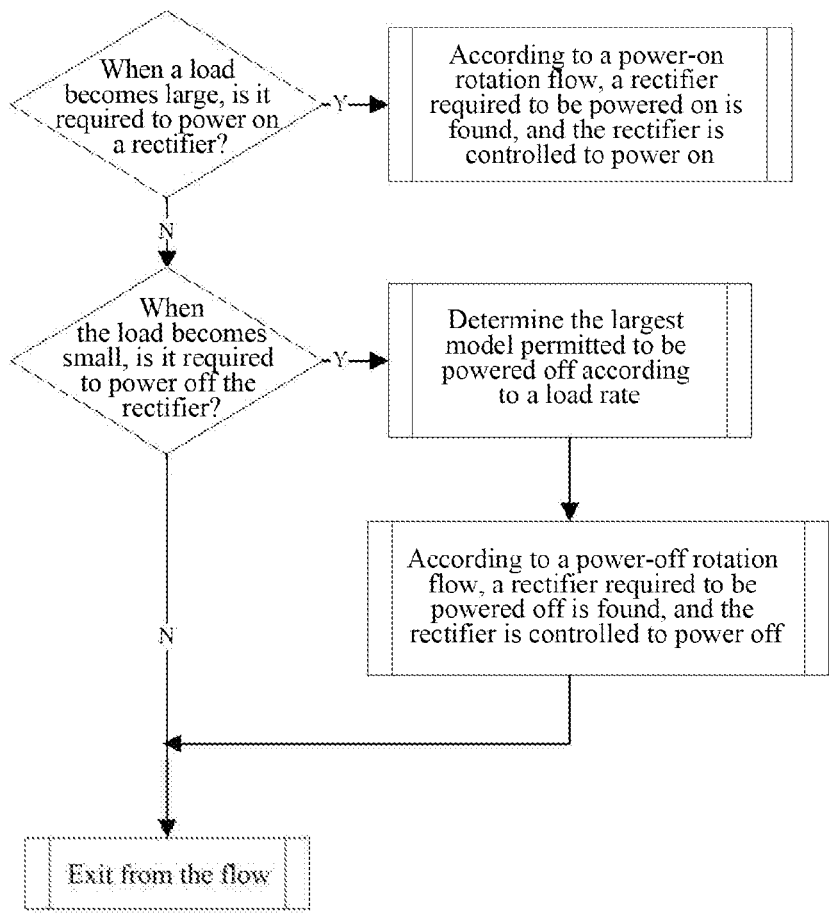
FIG. 4 is a flow chart of implementing load change rotation.

When the load suddenly becomes large, and it is required to power on the rectifier, a rectifier which needs to be controlled to power on is found according to the foregoing power-on rotation flow, and then the rectifier is controlled to power on. The corresponding process is as shown in FIG. 4.

When the load suddenly becomes small, and it is required to power off the rectifier, due to the limitation of the load rate, firstly, according to the current required for calculating a load rate of 80%, and in combination with the rated output currents of the rectifiers of each model, the largest model permitted to be powered off is determined. Then, a rectifier which needs to be controlled to power off is found according to the foregoing power-off rotation flow, and eventually the rectifier is controlled to power off, and the rotation process of the load becoming small can be completed.

In step 6, the periodic rotation implementation is performed.

The periodic rotation requires compulsively powering on the rectifier and compulsively powering off the rectifier, so that the working time of each rectifier is balanced as far as possible, and the service life of the rectifier is extended.

Figure 5:
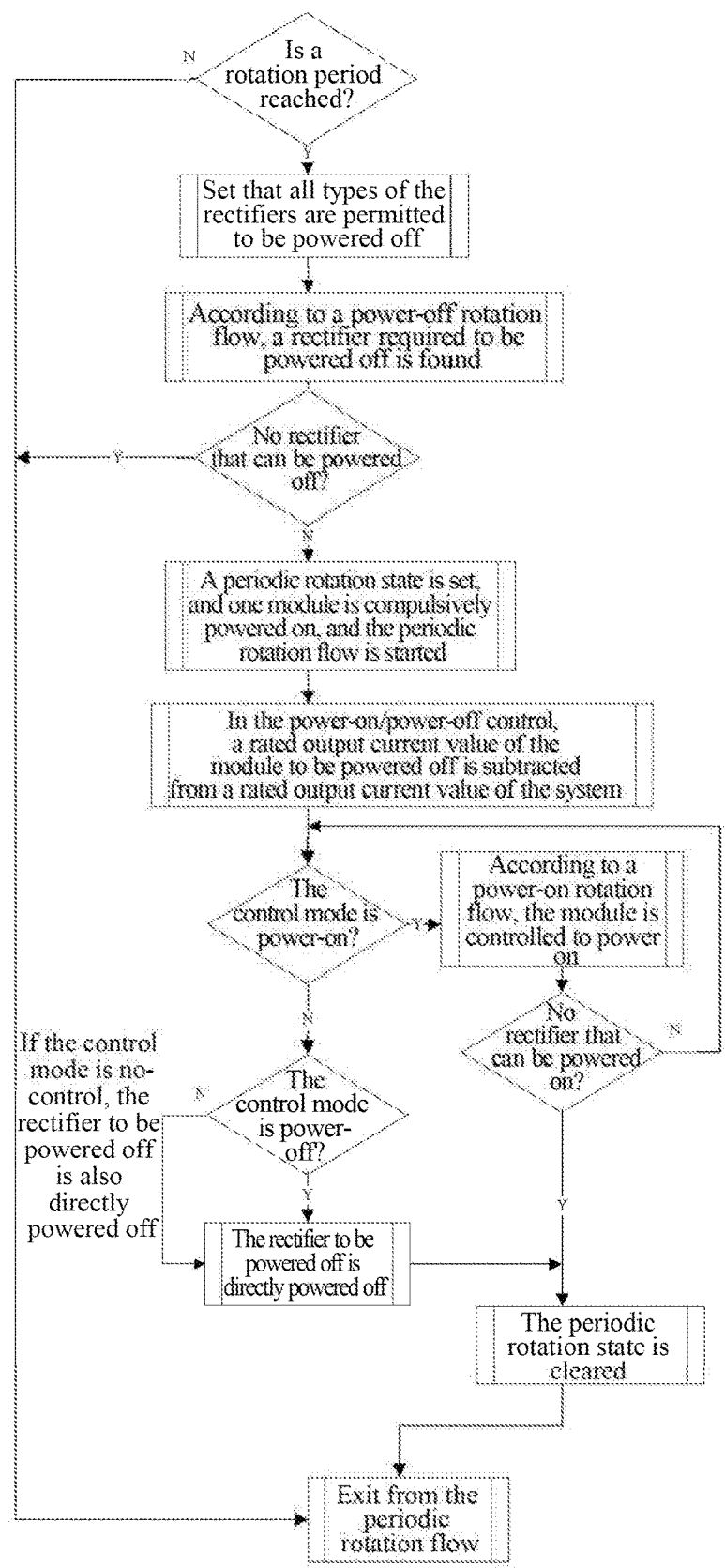
FIG. 5 is a flow chart of implementing periodic rotation.

Correspondingly, the periodic rotation process is as shown in FIG. 5, firstly it is to judge whether a rotation period is reached, if the rotation period does not reach, the periodic rotation flow is not started. If the rotation period is reached, firstly it is to set that all types of the rectifiers are permitted to be powered off, and then according to the power-off rotation flow, a rectifier required to be powered off is found. If an appropriate rectifier is not found, the periodic rotation flow is not started. If the rectifier required to be powered off is found, a serial number of the rectifier is recorded, a periodic rotation state is set, and then one module is compulsively powered-on, and the periodic rotation flow is started.

After the periodic rotation flow is started, when the power-on/power-off control mode of the rectifier is determined in the step 2 of the embodiment, it is required to subtract the rated output current value of the module to be powered off from the rated output current value of the powered-on rectifiers in the system, thus the control mode of the system automatically becomes power-on, and until the output capability of the system is enough, the control mode will become power-off.

When the control mode is power-on, according to the power-on rotation flow, the rectifier is controlled to power on. If it is required to power on but there is no rectifier that can be powered on, it indicates that the system does not have the rectifier that can be powered on any more, the periodic rotation state is cleared, and it is to exit from the periodic rotation flow. When the control mode is power-off, the rectifier to be powered off is directly powered off, and then the periodic rotation state is cleared, and it is to exit from the periodic rotation flow.

In step 7, the manual maintenance testing is implemented.

The manual maintenance testing is a working mode required in the energy-saving specifications of China Mobile, and it is mainly used for demonstrating the rectifier rotation to the users. In the case that a one-to-one corresponding relation is preset between slots and addresses of the rectifiers, it requires that the rectifiers can be powered-on and powered off for one period according to a slot sequence. During the manual maintenance testing, both the load rate and the three-phase equilibrium are secondary, it is mainly to guarantee that the load power supply is safe, and the rectifiers can be powered-on and powered off according to the slot sequence.

Figure 6:
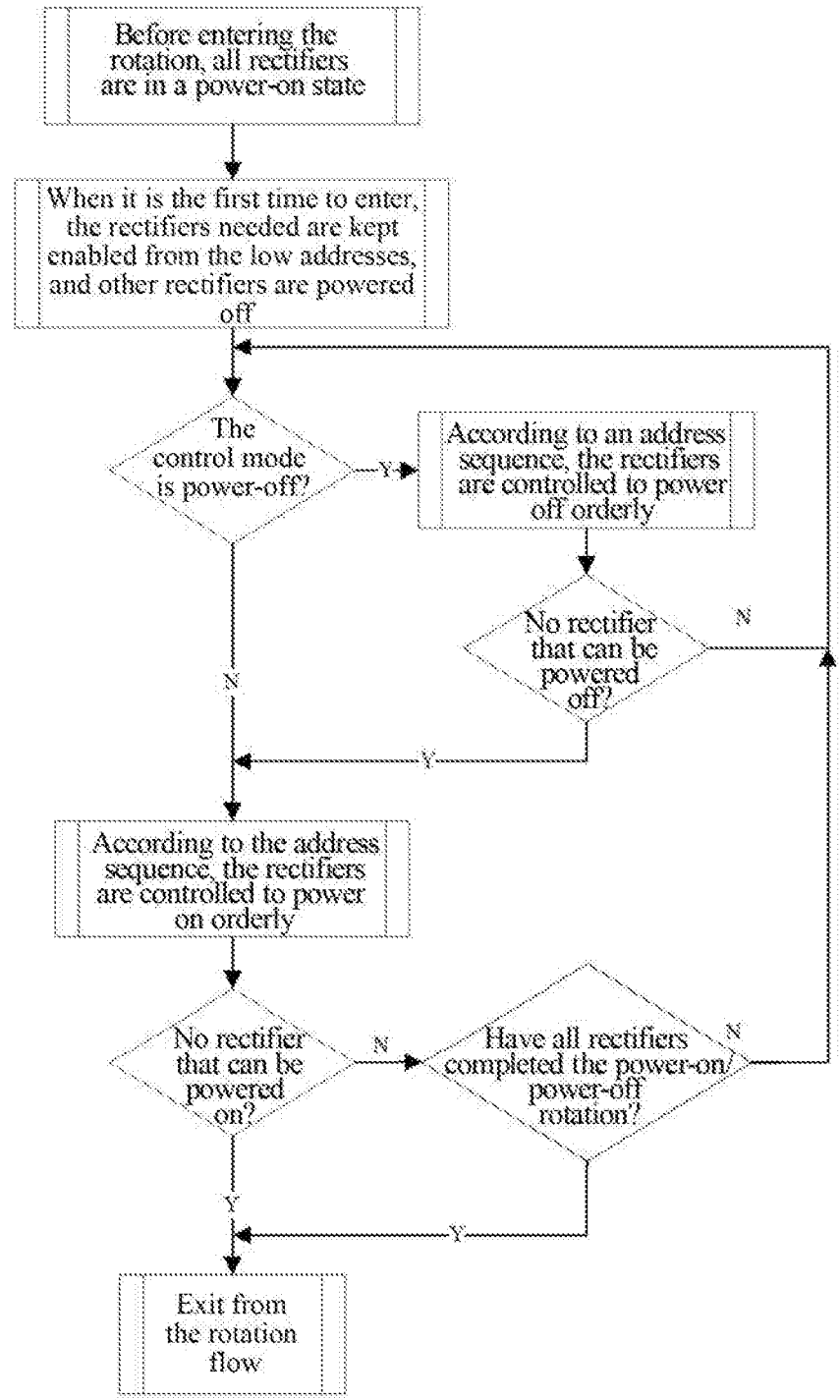
FIG. 6 is a flow chart of implementing manual maintenance testing on the rotation of rectifiers.

Correspondingly, the manual maintenance testing process is as shown in FIG. 6, before entering the rectifier rotation, all rectifiers are in the power-on state. When it is the first time to enter the rectifier rotation, the rectifiers needed are kept enabled from the low addresses, and other rectifiers are controlled to power off. This is taken as an initial state of the manual maintenance testing on the rectifier rotation, and then according to the power-on/power-off control mode of the rectifier determined in the step 2 of the embodiment, control on the rectifier is performed.

When the control mode is power-off, according to the address sequence, the rectifiers are controlled to power off orderly. Before controlling to power off, it is required to calculate a load rate after the rectifier to be powered off is powered off, if the load rate is greater than a set rate (e.g., the set rate is 80%), it is not permitted to power off the rectifier. If there is no rectifier that can be powered off, or when the control mode is power-on or no-control, according to the address sequence, the rectifiers are controlled to power on orderly.

An exit condition of the manual maintenance testing on the rectifier rotation is that: 1) there is no rectifier that can be powered on; or 2) all rectifiers have completed the power-on/power-off rotation. The two is in a relation of or, that is, it can normally exit from the manual maintenance testing on the rectifier rotation when either 1) or 2) is met.

Embodiment 2

As shown in FIG. 7, the embodiment provides a device 70 for implementing energy saving for a mixed insertion system of rectifiers with different power, and the device at least includes the following four units.

A first unit 71 is configured to, acquire work-related input information, and identify a type of a rectifier;

wherein, the work-related input information includes but is not limited to the following information:

related parameter information, real-time data information and real-time alarm information.

A second unit 72 is configured to, determine a power-on/power-off control mode of each rectifier;

a third unit 73 is configured to, perform power-on/power-off rotation, and load change rotation and periodic rotation starting according to the power-on/power-off control mode of each rectifier; and a fourth unit 74 is configured to, perform manual maintenance testing on all rectifiers.

Correspondingly, the process of the manual maintenance testing includes: orderly powering on and powering off the rectifiers according to an address sequence, performing control on the rectifier according to the pre-determined power-on/power-off control mode of the rectifier, and when the control mode is power-on or no-control, compulsively powering on one rectifier; and when the control mode is power-off, calculating a load rate after the rectifier to be powered off is powered off, and when the load rate is less than a set rate, powering off the rectifier, and when the load rate is greater than or equal to the set rate, not powering off the rectifier.

Correspondingly, the process of the above third unit 73 performing power-on/power-off rotation according to the power-on/power-off control mode of each rectifier is as follows:

selecting models of rectifiers required to be powered on or powered off, wherein, selecting the models of the rectifiers before the power-on/power-off operation refers to: allocating working time of rectifiers at each power level according to power ratios between rectifiers of different models, so that a power-on opportunity of the rectifier is directly proportional to power of the rectifier;

making statistics of phase currents of alternating current three phases, and powered-on times of rectifiers required to be powered on or powered off on the alternating current three phases;

according to the phase currents of the alternating current three phases and the powered-on times of the rectifiers of the alternating current three phases, performing powered-on time sequencing on the rectifiers of the alternating current three phases; and performing power-on control or power-off rotation control according to the powered-on time sequencing, wherein, during the power-off control, performing power-off operation on a rectifier with a longest powered-on time in the powered-on time sequencing, and during the power-on control, performing power-on operation on a rectifier with a shortest powered-on time in the powered-on time sequencing in rectifiers in a power-off state.

The above third unit 73 performing powered-on time sequencing on the rectifiers of the alternating current three phases according to the phase currents of the alternating current three phases and the powered-on times of the rectifiers of the alternating current three phases refers to:

with respect to the power-on rotation, firstly performing sequencing from low to high according to a phase current of each phase, and when the phase currents are equal, performing sequencing from low to high according to the powered-on times of the rectifiers;

with respect to the power-off rotation, firstly performing sequencing from high to low according to a phase current of each phase, and when the phase currents are equal, performing sequencing from high to low according to the powered-on times of the rectifiers.

Moreover, the power-on rotation process in the power-on/power-off rotation control is as follows:

searching rectifiers of a set model meeting a power-on condition from a first phase to a third phase orderly, and until a first rectifier of the set model meeting the power-on condition is found, powering on the found rectifier, and ending the current power-on rotation process.

The power-off rotation process in the power-on/power-off rotation control is as follows:

searching rectifiers of a set model satisfying a power-off condition from the first phase to the third phase orderly, and until a first rectifier of the set model satisfying the power-off condition is found, powering off the found rectifier, and ending the current power-off rotation process.

The process of the load change rotation is as follows:

when the load suddenly becomes large, performing the power-on rotation control, and not performing any processing during making statistics of the phase currents in the power-on rotation control; and when the load suddenly becomes small, firstly calculating a load rate, and determining a rectifier of the largest model permitted to be powered off according to the load rate obtained by calculation and rated output currents of the rectifiers of each model, and performing power-off rotation operation on the determined rectifier of the largest model permitted to be powered off, wherein, a numerator for calculating the load rate takes a maximum value from a total output current of the rectifiers and a load current, and a denominator for calculating the load rate is a sum of the rated output currents of the rectifiers which are powered on normally.

The process of the periodic rotation is as follows:

whenever a rotation period is reached, determining a rectifier to be powered off according to a power-off principle; and powering on one or more rectifiers according to a power-on principle, and after output power of the powered-on rectifiers is enough, directly powering off the determined rectifier to be powered off.

Embodiment 3

As shown in FIG. 8, the embodiment introduces a mixed insertion system 80 of rectifiers with different power, and the device includes an embedded chip 81, a bus unit 82 and a relay 83, wherein:

the embedded chip 81 acquires work-related input information via the bus unit 82, and identifies a type of a rectifier, and a power-on/power-off control mode of each rectifier is determined by the bus unit, and according to the power-on/power-off control mode of each rectifier, the power-on/power-off rotation, load change rotation and periodic rotation starting are implemented by using the relay 83.

As can be seen from the above embodiment, in the embodiment of the present document, it is required to complete the identification for the types of the rectifiers with different power, and the identification can be completed by means of hardware characteristic signal, and the identification also can be completed by means of the software acquiring the communication data. According to an identification result, information including the rated output current and so on of each rectifier is recorded.

In the embodiment of the present document, the power-on/power-off control mode of the rectifier can be automatically determined. According to the real-time value of the load current and the real-time value of the battery current, and the actual output condition of the system, the power-on/power-off control mode of the system is determined. The power-on/power-off control mode is divided into three states: power-on, power-off and no-control.

In the embodiment of the present document, the concept of the working time ratio of the rectifiers is adopted, and the working time of the rectifiers at each power level is allocated according to a power ratio of the rectifiers, so that the high-power rectifiers can have more opportunities to be in the power-on state, and the power-on opportunities for the low-power rectifiers are relatively less. By doing this, the high-power rectifiers can be powered-on as much as possible, so as to make the number of the powered-on modules as small as possible, and reduce the no-load loss; and the rectifiers at each power level all can have the opportunities to participate in the rotation, so that the working time of each rectifier is balanced as far as possible, and the service life of the rectifier is extended.

In the embodiment of the present document, the system maintains timing of one power-on time for each rectifier. The power-on time of the rectifier is timed when the rectifier is in the normal operation and in the power-on state, and it is reset when the communication of the rectifier is disconnected or the rectifier is not inserted, and it is kept when the rectifier is powered off or it is in other states such as a failure state and so on. The total working time of the rectifiers of each model is the accumulation of the power-on timing of all the existent rectifiers of the model.

In the embodiment of the present document, the load condition of the three phases is calculated by means of rated current statistics on each phase, and the three-phase equilibrium of the system is preferentially controlled. The three-phase equilibrium is controlled according to the rated output condition of the rectifiers but not the number of the rectifiers on each phase, which can adapt to the situation that the rectifiers with different power are randomly inserted into arbitrary slots, and does not limit the slots in which the rectifiers are inserted.

In the embodiment of the present document, in the powered-on time statistics of the rectifiers of the alternating current three phases, firstly according to the supported rectifier models, it is to respectively make statistics of the shortest or longest powered-on time of the designated model of rectifiers in the designated state on a certain phase, and then the powered-on time of the rectifiers on the designated phase is adjusted according to an priority sequence, so that the relative powered-on time on the phase which has the rectifiers of the designated model most conforms to the requirements.

In the embodiment of the present document, in the load sudden change, the module can be automatically controlled to power on and power off according to the relative working time of the rectifiers with different power, the three-phase equilibrium principle and the working time balancing principle of a single module, which can make the rectifiers keep at the high efficiency point as far as possible in the case of guaranteeing the load power supply and battery power supply, and also guarantee that the working time of each rectifier is balanced as far as possible, thereby extending the service life of the rectifier.

In the embodiment of the present document, during the periodic rotation, according to the power-off principle, firstly a next rectifier required to be powered off is found, and then one or more rectifiers are powered-on according to the power-on principle, and after the output power of the powered-on rectifiers is enough, the previously found rectifier required to be powered off is directly powered off, which can guarantee that the rectifiers can rotate to work, and also guarantee the safe operation of the system.

In the embodiment of the present document, during the manual maintenance testing on the rectifier rotation, the rectifiers can be controlled to orderly power on and power off according to the address sequence of the rectifiers in the premise of guaranteeing that the load power supply is safe. Moreover, it can guarantee that all rectifiers are controlled to rotate one round, and the manual maintenance testing on the rectifier rotation ends in the initial rotation state, which has a higher user demonstration effect.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

With the brand-new energy-saving control policy adopted in the embodiments of the present document, the maximization of the energy-saving effect is implemented in a premise of guaranteeing that the system is safe and reliable, and the management on the mixed insertion of rectifiers with different power is also implemented, and in the case of guaranteeing the load power supply and battery power supply, the rectifiers are kept at the high efficiency point as far as possible, and unnecessary modules are turned off as much as possible in the meantime to reduce the no-load loss, which implements the energy-saving management, extends the service life of the module, and improves the reliability of the system.

What is claimed is:

1. A method for implementing energy saving for a mixed insertion system of rectifiers with different power, comprising:
   acquiring work-related input information, and identifying a type of a rectifier;
   determining a power-on/power-off control mode of each rectifier; and
   performing power-on/power-off rotation according to the power-on/power-off control mode of each rectifier;
   wherein performing the power-on/power-off rotation according to the power-on/power-off control mode of each rectifier comprises:
   selecting models of rectifiers required to be powered on or powered off;
   making statistics of phase currents of alternating current three phases, and powered-on times of rectifiers required to be powered on or powered off on the alternating current three phases;
   performing powered-on time sequencing on the rectifiers of the alternating current three phases according to the phase currents of the alternating current three phases and the powered-on times of the rectifiers of the alternating current three phases; and
   performing power-on or power-off rotation control according to the powered-on time sequencing;
   wherein, the selecting models of rectifiers required to be powered on or powered off comprises:
   allocating working times of rectifiers at each power level according to power ratios between rectifiers of different models, so that a power-on opportunity of the rectifier is directly proportional to power of the rectifier.

2. The method according to claim 1, wherein, the work-related input information comprises but is not limited to the following information:
   related parameter information, real-time data information and real-time alarm information.

3. The method according to claim 1, wherein
   the performing power-on or power-off rotation control according to the powered-on time sequencing comprises:
   during the power-off control, performing a power-off operation on a rectifier with a longest powered-on time in the powered-on time sequencing, and during the power-on control, performing a power-on operation on a rectifier with a shortest powered-on time in the powered-on time sequencing in rectifiers in a power-off state.

4. The method according to claim 3, wherein, performing powered-on time sequencing on the rectifiers of the alternating current three phases according to the phase currents of the alternating current three phases and the powered-on times of the rectifiers of the alternating current three phases comprises:

with respect to the power-on rotation, firstly performing sequencing from low to high according to a phase current of each phase, and when the phase currents are equal, performing sequencing from low to high according to the powered-on times of the rectifiers;

with respect to the power-off rotation, firstly performing sequencing from high to low according to a phase current of each phase, and when the phase currents are equal, performing sequencing from high to low according to the powered-on times of the rectifiers.

5. The method according to claims 3, wherein, the power-on rotation in the power-on/power-off rotation control comprises:

searching for rectifiers of a set model meeting a power-on condition from a first phase to a third phase orderly, and until a first rectifier of the set model meeting the power-on condition is found, powering on the found rectifier, and ending a current power-on rotation process.

6. The method according to claim 3, wherein, the power-off rotation in the power-on/power-off rotation control comprises:

searching for rectifiers of a set model meeting a power-off condition from the first phase to the third phase orderly, and until a first rectifier of the set model meeting the power-off condition is found, powering off the found rectifier, and ending the current power-off rotation process.

7. The method according to claim 1, comprising:

when a load suddenly becomes large, performing the power-on rotation control, and not performing any processing when making statistics of the phase currents in the power-on rotation control; and when the load suddenly becomes small, firstly calculating a load rate, and determining a rectifier of a largest model permitted to be powered off according to the load rate obtained by calculation and rated output currents of the rectifiers of each model, and performing a power-off rotation operation on the determined rectifier of the largest model permitted to be powered off, wherein, a numerator for calculating the load rate takes a maximum value from a total output current of the rectifiers and a load current, and a denominator for calculating the load rate is a sum of the rated output currents of the rectifiers that are powered on normally.

8. The method according to claim 1, comprising:

whenever a rotation period is reached, determining a rectifier to be powered off according to a power-off principle; and powering on one or more rectifiers according to a power-on principle, and after output power of powered-on rectifiers is enough, directly powering off the determined rectifier to be powered off.

9. The method according to claim 8, comprising:

orderly powering on and powering off the rectifiers according to an address sequence, performing control on the rectifier according to the pre-determined power-on/power-off control mode of the rectifier, and when the control mode is power-on or no-control, compulsively powering on one rectifier; and when the control mode is power-off, calculating a load rate after the rectifier to be powered off is powered off, and when the load rate is less than a set rate, powering off the rectifier, and when the load rate is greater than or equal to the set rate, not powering off the rectifier.

10. The method according to claim 3, wherein, the power-on rotation in the power-on/power-off rotation control comprises:

searching for rectifiers of a set model meeting a power-on condition from a first phase to a third phase orderly, and until a first rectifier of the set model meeting the power-on condition is found, powering on the found rectifier, and ending a current power-on rotation process.

11. The method according to claim 4, wherein, the power-on rotation in the power-on/power-off rotation control comprises:

searching for rectifiers of a set model meeting a power-on condition from a first phase to a third phase orderly, and until a first rectifier of the set model meeting the power-on condition is found, powering on the found rectifier, and ending a current power-on rotation process.

12. The method according to claim 3, wherein, the power-off rotation in the power-on/power-off rotation control comprises:

searching for rectifiers of a set model meeting a power-off condition from the first phase to the third phase orderly, and until a first rectifier of the set model meeting the power-off condition is found, powering off the found rectifier, and ending the current power-off rotation process.

13. The method according to claim 4, wherein, the power-off rotation in the power-on/power-off rotation control comprises:

searching for rectifiers of a set model meeting a power-off condition from the first phase to the third phase orderly, and until a first rectifier of the set model meeting the power-off condition is found, powering off the found rectifier, and ending the current power-off rotation process.

14. A device for implementing energy saving for a mixed insertion system of rectifiers with different power, comprising:

a first unit, configured to, acquire work-related input information, and identify a type of a rectifier;

a second unit, configured to, determine a power-on/power-off control mode of each rectifier; and a third unit, configured to, perform power-on/power-off rotation, according to the power-on/power-off control mode of each rectifier;

wherein the perform the power-on/power-off rotation according to the power-on/power-off control mode of each rectifier comprises:

select models of rectifiers required to be powered on or powered off;

make statistics of phase currents of alternating current three phases, and powered-on times of rectifiers required to be powered on or powered off on the alternating current three phases;

perform powered-on time sequencing on the rectifiers of the alternating current three phases according to the phase currents of the alternating current three phases and the powered-on times of the rectifiers of the alternating current three phases; and perform power-on or power-off rotation control according to the powered-on time sequencing;

wherein the select models of rectifiers required to be powered on or powered off comprises:

allocate working times of rectifiers at each power level according to power ratios between rectifiers of different models, so that a power-on opportunity of the rectifier is directly proportional to power of the rectifier.

15. A mixed insertion system of rectifiers with different power, comprising: an embedded chip, a bus unit and a relay, wherein:

the embedded chip is configured to, acquire work-related input information via the bus unit, and identify a type of a rectifier;

the bus unit is configured to, determine a power-on/power-off control mode of each rectifier; and the relay is configured to, perform power-on/power-off rotation according to the power-on/power-off control mode of each rectifier;

wherein the perform the power-on/power-off rotation according to the power-on/power-off control mode of each rectifier comprises:

select models of rectifiers required to be powered on or powered off;

make statistics of phase currents of alternating current three phases, and powered-on times of rectifiers required to be powered on or powered off on the alternating current three phases;

perform powered-on time sequencing on the rectifiers of the alternating current three phases according to the phase currents of the alternating current three phases and the powered-on times of the rectifiers of the alternating current three phases; and perform power-on or power-off rotation control according to the powered-on time sequencing;

wherein the select models of rectifiers required to be powered on or powered off comprises:

allocate working times of rectifiers at each power level according to power ratios between rectifiers of different models, so that a power-on opportunity of the rectifier is directly proportional to power of the rectifier.

* * * * *